US007127397B2

(12) United States Patent
Case

(10) Patent No.: US 7,127,397 B2
(45) Date of Patent: Oct. 24, 2006

(54) METHOD OF TRAINING A COMPUTER SYSTEM VIA HUMAN VOICE INPUT

(75) Inventor: Eliot M. Case, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 874 days.

(21) Appl. No.: 09/871,524

(22) Filed: May 31, 2001

(65) Prior Publication Data

US 2003/0130847 A1 Jul. 10, 2003

(51) Int. Cl.
*G10L 13/00* (2006.01)
*G10L 15/00* (2006.01)

(52) U.S. Cl. ....................... 704/260; 704/251; 704/254

(58) Field of Classification Search ............. 704/270.1, 704/231, 251, 9, 10, 243, 260, 275, 258, 704/254, 257
See application file for complete search history.

(56) References Cited

U.S. PATENT DOCUMENTS

| | | | | |
|---|---|---|---|---|
| 5,682,539 | A * | 10/1997 | Conrad et al. | 704/9 |
| 5,724,481 | A * | 3/1998 | Garberg et al. | 704/243 |
| 5,852,801 | A * | 12/1998 | Hon et al. | 704/244 |
| 6,041,300 | A * | 3/2000 | Ittycheriah et al. | 704/255 |
| 6,078,885 | A * | 6/2000 | Beutnagel | 704/258 |
| 6,092,044 | A * | 7/2000 | Baker et al. | 704/254 |
| 6,125,341 | A * | 9/2000 | Raud et al. | 704/275 |
| 6,144,938 | A * | 11/2000 | Surace et al. | 704/257 |
| 6,233,553 | B1 * | 5/2001 | Contolini et al. | 704/220 |
| 6,321,196 | B1 * | 11/2001 | Franceschi | 704/251 |
| 6,411,932 | B1 * | 6/2002 | Molnar et al. | 704/260 |
| 6,598,018 | B1 * | 7/2003 | Junqua | 704/251 |
| 6,598,020 | B1 * | 7/2003 | Kleindienst et al. | 704/270 |
| 6,629,071 | B1 * | 9/2003 | Mann | 704/251 |
| 6,694,296 | B1 * | 2/2004 | Alleva et al. | 704/255 |
| 6,721,706 | B1 * | 4/2004 | Strubbe et al. | 704/275 |
| 6,823,313 | B1 * | 11/2004 | Yuchimiuk et al. | 704/275 |
| 2002/0055844 | A1 * | 5/2002 | L'Esperance et al. | 704/260 |
| 2003/0182111 | A1 * | 9/2003 | Handal et al. | 704/231 |

OTHER PUBLICATIONS

R. M. K. Sinha, Dealing With Unknowns in machine Translation, IEEE 2001, IEEE 0-7803-7087-2/01.*

* cited by examiner

*Primary Examiner*—David Hudspeth
*Assistant Examiner*—James S. Wozniak
(74) *Attorney, Agent, or Firm*—Brooks Kushman P.C.

(57) ABSTRACT

A method of training a computer system via human voice input from a human teacher is provided. In one embodiment, the method includes presenting a text spelling of an unknown word and receiving a human voice pronunciation of the unknown word. A phonetic spelling of the unknown word is determined. The text spelling is associated with the phonetic spelling to allow a text to speech engine to correctly pronounce the unknown word in the future when presented with the text spelling of the unknown word.

10 Claims, 3 Drawing Sheets

METHOD OF TRAINING A COMPUTER SYSTEM VIA HUMAN VOICE INPUT

BACKGROUND OF THE INVENTION

1. Field of the Invention

The present invention relates to a method of training a computer system via human voice input from a human teacher, with the computer system including a speech recognition engine.

2. Background Art

A large concatenated voice system with a large vocabulary is capable of speaking a number of different words. For each word in the vocabulary of the large concatenated voice system, the system has been trained so that a particular word has a corresponding phonetic sequence. In large concatenated voice systems and other so-called artificial intelligence systems, manual data entry is usually used to train the systems. This is usually done by first training a data entry person the advanced skill sets required to program the phonetic knowledge into specific elements of the computer program for storage and future use. This type of training technique is tedious, prone to errors, and has a tendency to be academic in entry style rather than capturing a true example of how a word is pronounced or what a word, phrase, or sentence means or translates to.

Although the use of manual data entry to train large concatenated voice systems has been used in many applications that have been commercially successful, manual data entry training techniques have some shortcomings. As such, there is a need for a method of training a computer system that overcomes the shortcomings of the prior art.

SUMMARY OF THE INVENTION

It is, therefore, an object of the present invention to provide a method of training a computer system via human voice input from a human teacher.

In carrying out the above object, a method of training a computer system via human voice input from a human teacher is provided. The computer system has a text to speech engine and a speech recognition engine. The method comprises presenting a text spelling of an unknown word, and receiving a human voice pronunciation of the unknown word from the human teacher. The method further comprises determining a phonetic spelling of the unknown word with the speech recognition engine based on the human voice pronunciation of the unknown word. The text spelling is associated with the phonetic spelling to allow the text to speech engine to correctly pronounce the unknown word in the future, when presented with the text spelling of the unknown word.

It is appreciated that the phonetic spelling determined for the unknown word with the speech recognition engine may include a sequence of phonemes names and/or known words. In a preferred embodiment, after presenting the text spelling of the unknown word, the computer system, using speech output, requests to receive the human voice pronunciation of the unknown word. The request from the computer system takes a form of an ongoing dialog between the computer system and the human teacher. More preferably, the method further comprises establishing a plurality of request statements. Each request statement has an information content level. The information content levels range from a low information content level to a high information content level. The plurality of request statements are used by the computer system during the ongoing dialog. Most preferably, presenting, receiving, determining, and associating are repeated for a plurality of unknown words. The information content level for the request statements in the ongoing dialog progressively lessens as presenting, receiving, determining, and associating are repeated.

Further, in carrying out the present invention, a method of training a computer system via human voice input from a human teacher is provided. The computer system has a speech recognition engine. The method comprises receiving a human voice pronunciation of an unknown word from the human teacher. The method further comprises determining a phonetic spelling of the unknown word with the speech recognition engine based on the human voice pronunciation of the unknown word, and receiving a known word that is related in meaning to the unknown word. The known word is associated with the phonetic spelling of the unknown word to allow the speech recognition engine to correctly recognize the unknown word in the future as related in meaning to the known word.

Preferably, receiving the known word further comprises receiving a human voice pronunciation of the known word from the human teacher. Alternatively, receiving the known word further comprises receiving a text spelling of the known word.

Still further, in carrying out the present invention, a computer readable storage medium having instructions stored thereon that direct a computer to perform a method of training a computer system via human voice input from a human teacher is provided. The computer system has a text to speech engine and a speech recognition engine. The medium further comprises instructions for presenting a text spelling of an unknown word, and instructions for receiving a human voice pronunciation of the unknown word from the human teacher. The medium further comprises instructions for determining a phonetic spelling of the unknown word with the speech recognition engine based on the human voice pronunciation of the unknown word. And further, the medium further comprises instructions for associating the text spelling with the phonetic spelling. This association allows the text to speech engine to correctly pronounce the unknown word in the future when presented with the text spelling of the unknown word.

Even further, in carrying out the present invention, a computer readable storage medium having instructions stored thereon that direct a computer to perform a method of training a computer system via human voice input from a human teacher is provided. The computer system has a speech recognition engine. The medium further comprises instructions for receiving a human voice pronunciation of an unknown word from the human teacher, and instructions for determining a phonetic spelling of the unknown word with the speech recognition engine based on the human voice pronunciation of the unknown word. The medium further comprises instructions for receiving a known word that is related in meaning to the unknown word, and instructions for associating the known word with the phonetic spelling of the unknown word. The association allows the speech recognition engine to correctly recognize the unknown word in the future as related in meaning to the known word.

The advantages associated with embodiments of the present invention are numerous. In accordance with the present invention, a system and method to train computer systems via human voice input are provided. Automatic phonetic transcription may be used to enable human teaching of semi-intelligent computer systems correct pronunciation for speech output and word, phrase, and sentence meanings. Further, speech output from and human speech input to a computer may be used to ask human teachers questions and accept input from the human teacher to improve performance of the computer system.

The above object and other objects, features, and advantages of the present invention will be readily appreciated by one of ordinary skill in the art in the following detailed description of the preferred embodiment when taken in connection with the accompanying drawings.

DETAILED DESCRIPTION OF THE PREFERRED EMBODIMENT(S)

Figure 1:
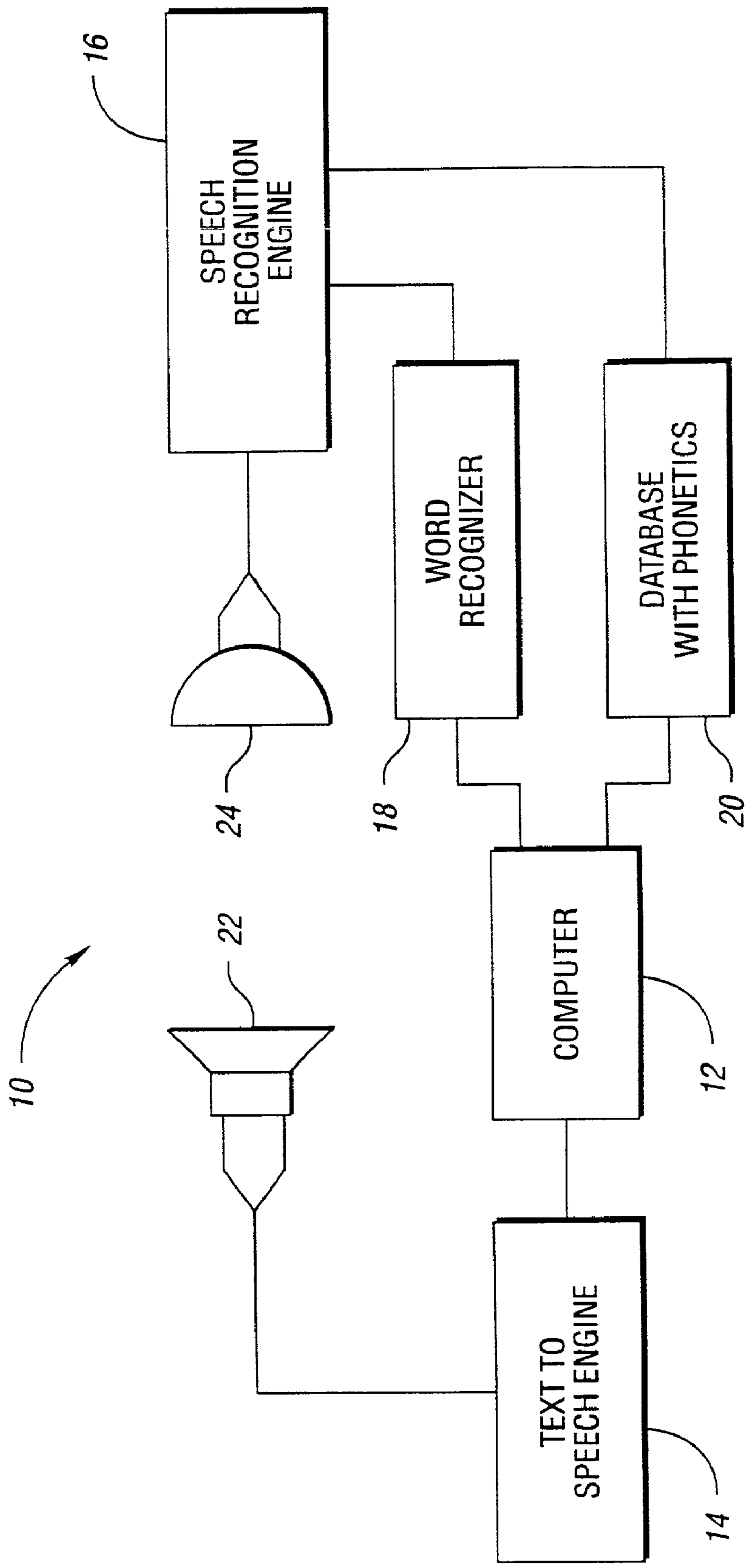
FIG. 1 illustrates a computer system and a method of training the computer system in accordance with the present invention.

With reference now to FIG. 1, a computer system is generally indicated at 10. System 10 includes a computer 12, a text to speech engine 14, and a speech recognition engine 16. Speech recognition engine 16 uses word recognizer 18 and/or database with phonetics 20 to determine the phonetic spelling of an unknown word based on human voice pronunciation of the unknown word. System 10 includes speaker 22 and microphone 24.

In accordance with the present invention, computer system 10 is trained via human voice input from a human teacher. First, computer 12 is presented with a text spelling of an unknown word. The text spelling of the unknown word may be presented to computer 12 in a variety of ways. For example, computer 12 may manually receive the text spelling of the unknown word, or may, in any other way, come across the text spelling of the unknown word. Thereafter, a human voice pronunciation of the unknown word is received by system 10 at microphone 24 from a human teacher. Speech recognition engine 16 determines a phonetic spelling of the unknown word based on the human voice pronunciation of the unknown word. It is appreciated that the phonetic spelling may include a sequence of phonemes names and/or known words as determined by word recognizer 18 and/or database with phonetics 20. Further, in a preferred implementation, after the text spelling of the unknown word is presented, system 10, using speech output at speaker 22, requests to receive the human voice pronunciation of the known word.

Figure 2:
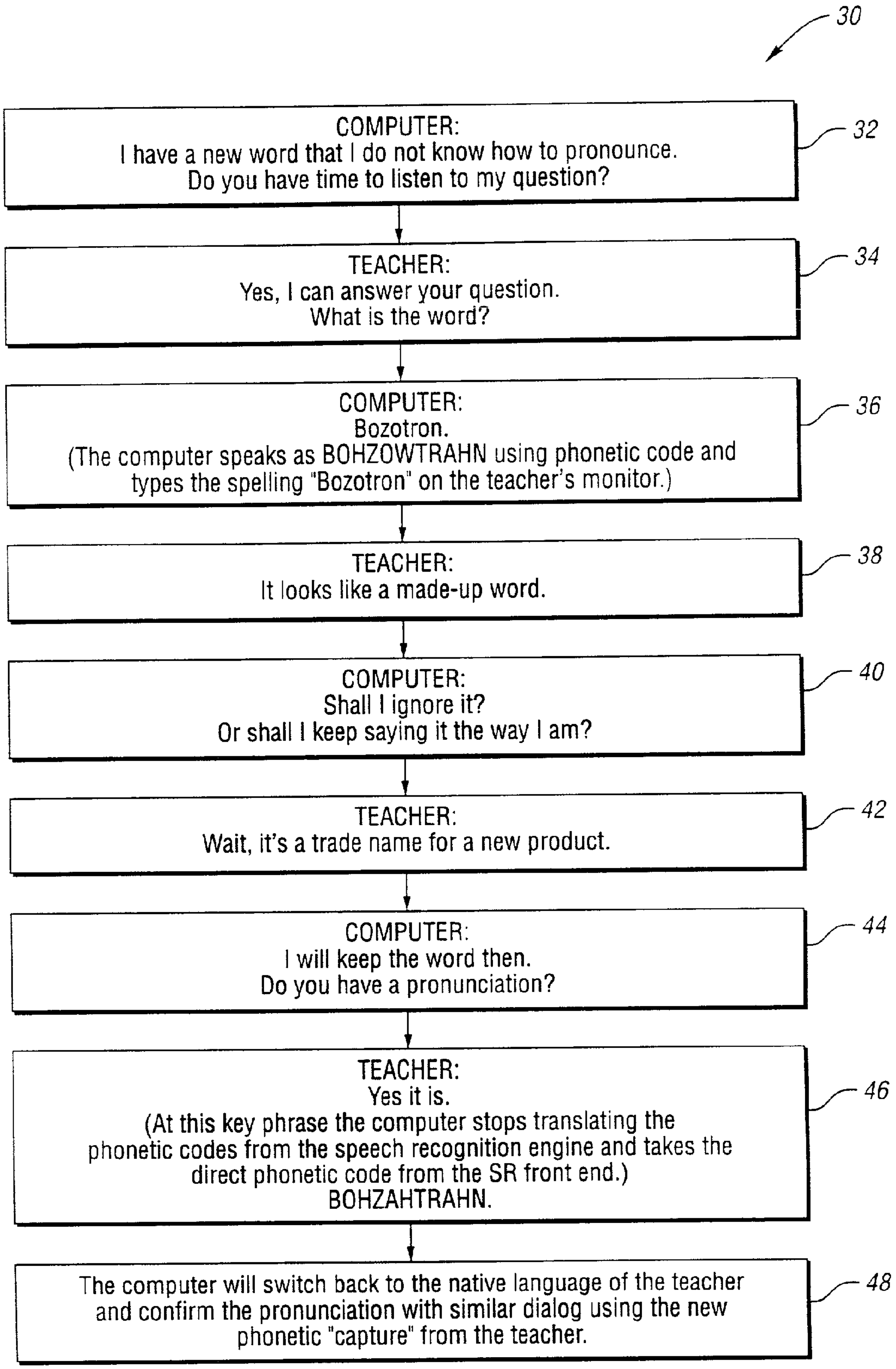
FIG. 2 illustrates a method of training the computer system in accordance with the present invention.

In a preferred embodiment, the request by the computer system to receive the human voice pronunciation of the unknown word takes a form of an ongoing dialog between the computer system and the human teacher as illustrated by example in FIG. 2.

That is, in accordance with the present invention, speech output from and speech input to a computer is used to ask human teachers questions and accept input from the human teacher to improve performance of the computer system. The improved performance can be: how the computer is performing an operation such as pronouncing a word or assembling a sentence or phrase, or how the computer is translating information. A natural dialog with the computer can be set so that realistic data can be captured. For example, if the word "bozotron" is being pronounced by the system, the computer can ask the teacher for advice on how to pronounce the word. The computer would have a list of ways to ask the questions with a variable for the questionable data. Further, the computer may develop its own questions.

As best shown in FIG. 2, an example of an ongoing natural dialog between a human teacher and a computer is generally indicated at 30. At block 32, the computer has been presented with the text spelling of the unknown word and is requesting to receive the human voice pronunciation of the unknown word. At block 34, the teacher responds to the computer. At block 36, the computer responds to the teacher and shows the teacher the text spelling of the unknown word. At blocks 38, 40, 42, and 44, the teacher and the computer maintain an ongoing dialog, discussing the unknown word. At block 46, the teacher provides the computer system with the human voice pronunciation of the unknown word. At this point, the computer stops translating the phonetic codes from the speech recognition engine and takes the direct phonetic code from the speech recognition front end. That is, the computer determines the phonetic spelling of the unknown word with the speech recognition engine 16 (FIG. 1) based on the human voice pronunciation of the unknown word. At block 48, the computer switches back to the native language of the teacher and confirms the pronunciation with similar dialog using the new phonetic capture from the teacher. Thereafter, the text spelling of the unknown word is associated with the phonetic spelling determined by the speech recognition engine to correctly pronounce the unknown word in the future when presented with the text spelling of the unknown word.

It is appreciated that a plurality of statements are established for use by the computer during the dialog with the human teacher. In a preferred implementation, each statement or request statement (because the statements are used to ultimately request to receive the human voice pronunciation of the unknown word from the human teacher) has an information content level. The information content levels range from a low information content level to a high information content level. The plurality of request statements are used by the computer system during the ongoing dialog.

Preferably, during the ongoing dialog, the computer system progressively lessens the information content level for the request statements used in the ongoing dialog. For example, at block 32, the computer may explain that it has several words that it does not know how to pronounce. Thereafter, for the first unknown word, request statements having high information content levels are used until the text spelling of the unknown word is associated with a phonetic spelling. Thereafter, the computer system may repeat the same steps, this time for the second unknown word, but this time using request statements having a slightly lower information content level. And again, after the second unknown word text spelling has been associated with a phonetic spelling, the process may again be repeated for the third word. This time, for the third word, an even lower information content level may be used for the request statements. The use of progressively lower information content levels for the request statements provides a more natural conversation flow between the human teacher and the computer system. For example, by the time the computer is asking to receive the human voice pronunciation of a tenth word, it is no longer necessary for the computer to say "I have a new word that I do not know how to pronounce. Do you have time to listen to my question?" Instead, the computer may say "Want to hear the next one?" or "Got time for another?"

Figure 3:
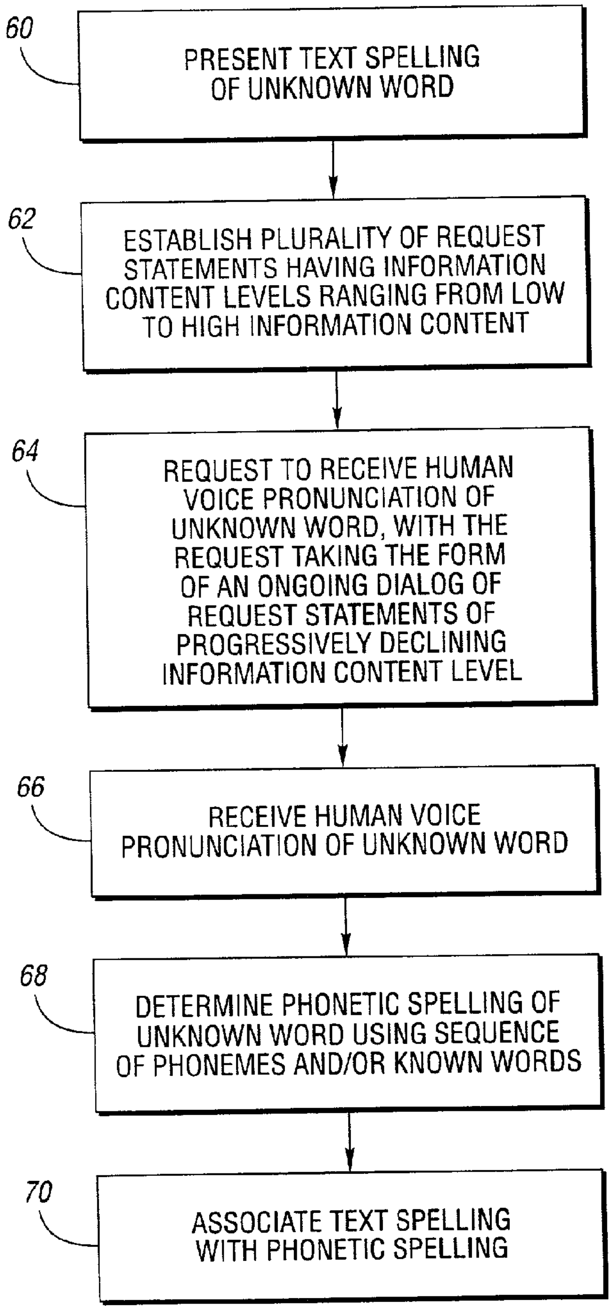
FIG. 3 illustrates a method of the present invention.

It is appreciated that embodiments of the present invention provide a method of training a computer system via human voice input from a human teacher. Automatic phonetic transcription is used to enable human teaching of semi-intelligent computer systems correct pronunciation for speech output and word, phrase, and sentence meanings. As shown in FIG. 3, a first method of the present invention includes, at block 60, presenting a text spelling of an unknown word. At block 62, a plurality of request statements having information content levels ranging from low to high information content are established. At block 64, the computer system requests to receive human voice pronunciation of the unknown word. The request takes the form of an ongoing dialog (for example, FIG. 2) of request statements of progressively declining information content level. The information content level may decline during the ongoing dialog for a single unknown word, or may progressively decline during an ongoing dialog in which multiple unknown words are processed. At block 66, the computer system receives human voice pronunciation of the unknown word. At block 68, the computer system determines the phonetic spelling of the unknown word using a sequence of phonemes and/or known words. At block 70, the text spelling of the unknown word is associated with the determined phonetic spelling of the unknown word to allow the text to speech engine to correctly pronounce the unknown word in the future when presented with the text spelling of the unknown word again.

Figure 4:
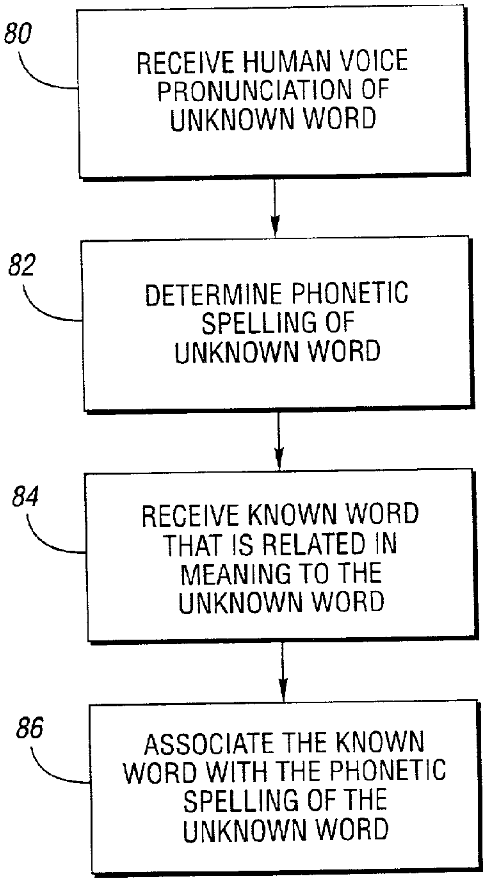
FIG. 4 illustrates another method of the present invention.

Another embodiment of the present invention is illustrated in FIG. 4. At block 80, the human voice pronunciation of an unknown word is received from the human teacher. At block 82, a phonetic spelling of the unknown word is determined with the speech recognition and is based on the human voice pronunciation of the unknown word. At block 84, a known word is received. The known word is related in meaning to the unknown word. At block 86, the known word is associated with the phonetic spelling of the unknown word to allow the speech recognition engine to correctly recognize the unknown word in the future as related in meaning to the known word. That is, the embodiment illustrated in FIG. 4, associates a known word with phonetic spellings of unknown words. For example, the method illustrated in FIG. 4 may be utilized to provide a smart lookup system. For example, the teacher may request the computer system to look up information relating to "car parts." The computer system may respond by stating "I don't have any listing for car parts." The teacher may respond by stating "Do you have any listings for automobile parts or auto parts?" The computer may respond "Yes, I have listings for auto parts." The teacher may respond "For future reference, car parts are the same thing as auto parts." (Block 84.) Thereafter, the computer system associates the known word "auto parts" with the phonetic spelling of the unknown word "car parts." In the future, if a user were to ask the computer system "Do you have any listings for car parts?" the computer would then respond "I do not have any listing specifically for car parts, however, I do have listings for auto parts which are known to me to be related in meaning to car parts."

It is appreciated that in the method illustrated in FIG. 4, receiving the known word may include receiving a human voice pronunciation of the known word from the human teacher or receiving a text spelling of the known word. For example, the known word "auto parts" corresponding to the unknown word "car parts" may be provided by human voice input or by text input.

It is appreciated that in accordance with the present invention, methods may be implemented via a computer readable storage medium having instructions stored thereon that direct a computer to perform a method of the present invention. That is, the methods as described in FIGS. 1–4 may be implemented, in accordance with the present invention, via instructions stored on a computer readable storage medium. For example, to implement the method of FIG. 3, a computer readable storage medium has instructions stored thereon including instructions for presenting a text spelling of an unknown word, and instructions for receiving a human voice pronunciation of the unknown word from the human teacher. The medium also includes instructions for determining a phonetic spelling of the unknown word. The medium even further includes instructions for associating the text spelling with the phonetic spelling.

In addition, the method illustrated in FIG. 4 may be implemented via instructions on a computer readable storage medium. The medium includes instructions for receiving a human voice pronunciation of an unknown word from a human teacher, and instructions for determining a phonetic spelling of the unknown word. The medium further includes instructions for receiving a known word that is related in meaning to the unknown word, and instructions for associating the known word with the phonetic spelling of the unknown word.

In addition, it is appreciated that all optional features and preferred features described herein for methods of the present invention may also be implemented as instructions on a computer readable storage medium.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method of training a computer system via human voice input from a human teacher, the computer system having a text to speech engine and a speech recognition engine, the method comprising:

presenting a text spelling of an unknown word;

requesting to receive the human voice pronunciation of the unknown word using speech output;

wherein the request from the computer system takes a form of an ongoing natural language dialog between the computer system and the human teacher with the computer system having a list of ways to ask questions with a variable for the questionable data;

receiving a human voice pronunciation of the unknown word from the human teacher;

determining a phonetic spelling of the unknown word with the speech recognition engine based on the human voice pronunciation of the unknown word; and associating the text spelling with the phonetic spelling to allow the text to speech engine to correctly pronounce the unknown word in the future when presented with the text spelling of the unknown word.

2. The method of claim 1 wherein the phonetic spelling includes a sequence of phonemes.

3. The method of claim 1 wherein the phonetic spelling includes a sequence of known words.

4. The method of claim 1 further comprising:

establishing a plurality of request statements, each request statement having an information content level, the information content levels ranging from a low information content level to high information content level, the plurality of request statements being used by the computer system during the ongoing dialog.

5. The method of claim 4 wherein presenting, receiving, determining, and associating are repeated for a plurality of unknown words, and wherein the information content level for the request statements in the ongoing dialog progressively lessens as presenting, receiving, determining, and associating are repeated.

6. A computer readable storage medium having instructions stored thereon that direct a computer to perform a method of training a computer system via human voice input from a human teacher, the computer system having a text to speech engine and a speech recognition engine, the medium further comprising:

instructions for presenting a text spelling of an unknown word;

requesting to receive the human voice pronunciation of the unknown word suing speech output;

wherein the request from the computer system takes a form of an ongoing natural language dialog between the computer system and the human teacher with the computer system having a list of ways to ask questions with a variable for the questionable data;

instructions for receiving a human voice pronunciation of the unknown word from the human teacher;

instructions for determining a phonetic spelling of the unknown word with the speech recognition engine based on the human voice pronunciation of the unknown word; and instructions for associating the text spelling with the phonetic spelling to allow the text to speech engine to correctly pronounce the unknown word in the future when presented with the text spelling of the unknown word.

7. The medium of claim 6 wherein the phonetic spelling includes a sequence of phonemes.

8. The medium of claim 6 wherein the phonetic spelling includes a sequence of known words.

9. The medium of claim 6 further comprising:

instructions for establishing a plurality of request statements, each request statement having an information content level, the information content levels ranging from a low information content level to a high information content level, the plurality of request statements being used by the computer system during the ongoing dialog.

10. The medium of claim 9 wherein presenting, receiving, determining, and associating are repeated for a plurality of unknown words, and wherein the information content level for the request statements in the ongoing dialog progressively lessens as presenting, receiving, determining, and associating are repeated.

* * * * *